US008145619B2

(12) United States Patent
Bowden et al.

(10) Patent No.: US 8,145,619 B2
(45) Date of Patent: Mar. 27, 2012

(54) METHOD AND SYSTEM FOR IDENTIFYING COMPANIES WITH SPECIFIC BUSINESS OBJECTIVES

(75) Inventors: Timothy R. Bowden, Sparks, MD (US); Upendra Chitnis, Jersey City, NJ (US); Ildar K. Khabibrakhmanov, Syosset, NY (US); Richard D. Lawrence, Ridgefield, CT (US); Yan Liu, Elmsford, NY (US); Prem Melville, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 12/028,877

(22) Filed: Feb. 11, 2008

(65) Prior Publication Data

US 2009/0204569 A1 Aug. 13, 2009

(51) Int. Cl.
*G06F 7/00* (2006.01)
*G06F 17/30* (2006.01)
*G06F 13/14* (2006.01)

(52) U.S. Cl. ......... 707/710; 707/705; 707/706; 707/709

(58) Field of Classification Search ............. 707/999.01, 707/999.004, 999.006, 999.1, 760, 999.007, 707/10, 710, 803; 709/224; 706/62
See application file for complete search history.

(56) References Cited

U.S. PATENT DOCUMENTS 6,901,590 B2 5/2005 Narayanaswamy et al.
7,454,430 B1 * 11/2008 Komissarchik et al. ............... 1/1
7,584,194 B2 * 9/2009 Tuttle et al. ........................... 1/1

OTHER PUBLICATIONS

Melville et al., Finding New customers Using Ustructured and structured Data, Aug. 12-15, 2007.*
Smith, "Relevancy of Market Research in Business Markets", The Wiglaf Journal, Apr. 14, 2004.
Melville et al., "Finding New Customers Using Unstructured and Structured Data".

* cited by examiner

*Primary Examiner* — Cam-Y Truong
*Assistant Examiner* — Cecile Vo
(74) *Attorney, Agent, or Firm* — Scully, Scott, Murphy & Presser, P.C.; Daniel P. Morris, Esq.

(57) ABSTRACT

A method for identifying companies with specific business objectives that includes using existing sources of company firmographic data to identify a broad set of companies and associated websites, crawling the websites associated with the identified companies and indexing web site content for each of the identified companies with the specific business objective to realize indexed web content. The method further includes joining the company firmographic data with the indexed web content using a business objective common identifier to generate a store of joined structured firmographic data and indexed web content and presenting a display image representation of the store of joined structured firmographic data and indexed web content for user review. The display image further receives user input to score each of said companies identified therein, and using a search interface, querying the store of scored, joined structured firmographic data and indexed web content. The method further includes augmenting the search interface, or search results from a query, with predictive, machine-leaning processes that allow rapid identification of companies possibly missed in the query.

7 Claims, 6 Drawing Sheets

ABCOT also finds "MANAGEMENT SCIENCE ASSOCIATES" ... but it also finds other companies within the specified firmographic window

METHOD AND SYSTEM FOR IDENTIFYING COMPANIES WITH SPECIFIC BUSINESS OBJECTIVES

BACKGROUND OF THE INVENTION

The present invention relates to a system and method for identifying companies with specific business objectives.

Sales-oriented companies need to continue to find new customers for their products and services. Market segmentation is often used in marketing studies to characterize potential clients in terms of their overall buying or spending characteristics. For companies that sell into the consumer market, clients are individuals who purchase goods and services from these sellers. For companies that sell to other companies, market segmentation involves analyzing a broad set of companies as potential clients for their offerings. Such market segmentation studies typically use so-called firmographic data that includes the company's address, industry classification, available financial metrics, and other structured data.

Currently, there are number of data vendors that provide structured, firmographic information on companies. For example, Standard and Poor's provides detailed financial information obtained from SEC filings for all publicly traded companies. Dun and Bradstreet provides addresses and estimates of annual revenue, number of employees, etc., for a much larger set of public and private companies, including very small companies. These sources of firmographic information, however, provide no insight into the products and services offered by a company. Information about products and services offered by a company is often displayed on the company's website, and can be located via Internet search engines.

Known search methods, however, do not present a unified view of the combined structured data, and the unstructured web content identified by a search. The following specific example highlights the shortcomings of known search methods when a unified searching view is desired. The example assumes that a search is required to identify companies in New York State, which have annual sales between $100M and $500M, and which provide consulting in Sarbanes Oxley compliance. Entering "Sarbanes Oxley consulting" into a known search engine will return a list of relevant sites, some of which may be links to companies that actually offer this type of service. The conventional search techniques, however, fail to identify those companies that offer this service AND meet the location AND meet the revenue requirements, as stated.

Similarly, querying a database containing firmographic data will allow one to easily locate companies that meet the firmographic requirements, but will not return a subset of companies that actually offer the consulting service.

SUMMARY OF THE INVENTION

With respect to this discussion of the background of the invention, we have now discovered that there is a distinct need in the art for a system or method for identifying business entities with specific business objectives as a unified view of combined structured data and unstructured web content. To that end, the present invention provides a method and system for identifying companies with specific objectives, which overcomes the shortcomings of the prior art.

Companies that sell products and services to other companies require broad insight into the business strategies and objectives of a wide universe of companies in order to build effective marketing campaigns. The universe of companies may include potential clients, potential business partners, and candidates for corporate acquisitions. Current sources of structured, firmographic data (e.g. the company's address, industry classification, available financial metrics, and other structured data) are not sufficient for this purpose. Internet search engines that search indexed web content can provide vast amounts of information, but do not provide the necessary focus on actual companies with relevance to the provided search terms.

The invention provides an efficient and effective search method for identifying companies with specific business objectives that include the following steps: (a) selecting a broad segment of companies using an available source of firmographic information; (b) crawling websites associated with the firmographic information and indexing web content of the identified companies in the segment; (c) merging or joining this indexed web content with the available firmographic information; (d) providing an information-retrieval interface that allows a user to pose complex queries that combine firmographic constraints with content relevance; and (e) augmenting the search interface with predictive models (using machine learning) that allow for rapid identification of companies possibly missed in the query that are associated with the specific business objective(s).

The invention includes a searching system for searching the World Wide Web (WWW) to identify companies having a specific business objective. The system includes a search processor for searching a store of company firmographic data to identify companies, and associated websites for the companies, in accordance with a specific business objective and a web crawling processor for crawling the websites of companies identified in accordance with the specific business objective, and indexing web content of said websites. The system also includes a data join processor for joining the firmographic data and indexed web content for said companies, and providing the joined data and content in a joined data and web content store. The search processor further provides for searching the store of joined data and web content.

The searching system also includes a web browser in communication with the search processor, as well as a searchable store of in-house confidential data, that is searched by the search processor along with the company firmographic data and indexed web content. A machine learning processor for implementing predictive modeling with the joined data and content store, and wherein the search processor searches the joined data and content store as arranged by said predictive modeling.

BRIEF DESCRIPTION OF THE DRAWING FIGURES

The foregoing and other objects, aspects and advantages will be better understood from the following detailed description of embodiments of the inventions, with reference to the drawings, in which:

FIG. 3 is a display image of query results derived by the searching system for a "Sarbanes Oxley" query;

FIG. 5 is a display image presenting searching system query results, and searching system query results for a query: "Sarbanes Oxley consulting.

DETAILED DESCRIPTION OF THE INVENTION

The inventive drawings and descriptions set forth herein are for exemplary purposes only, and are not meant to limit the scope and spirit of the invention.

Figure 1:
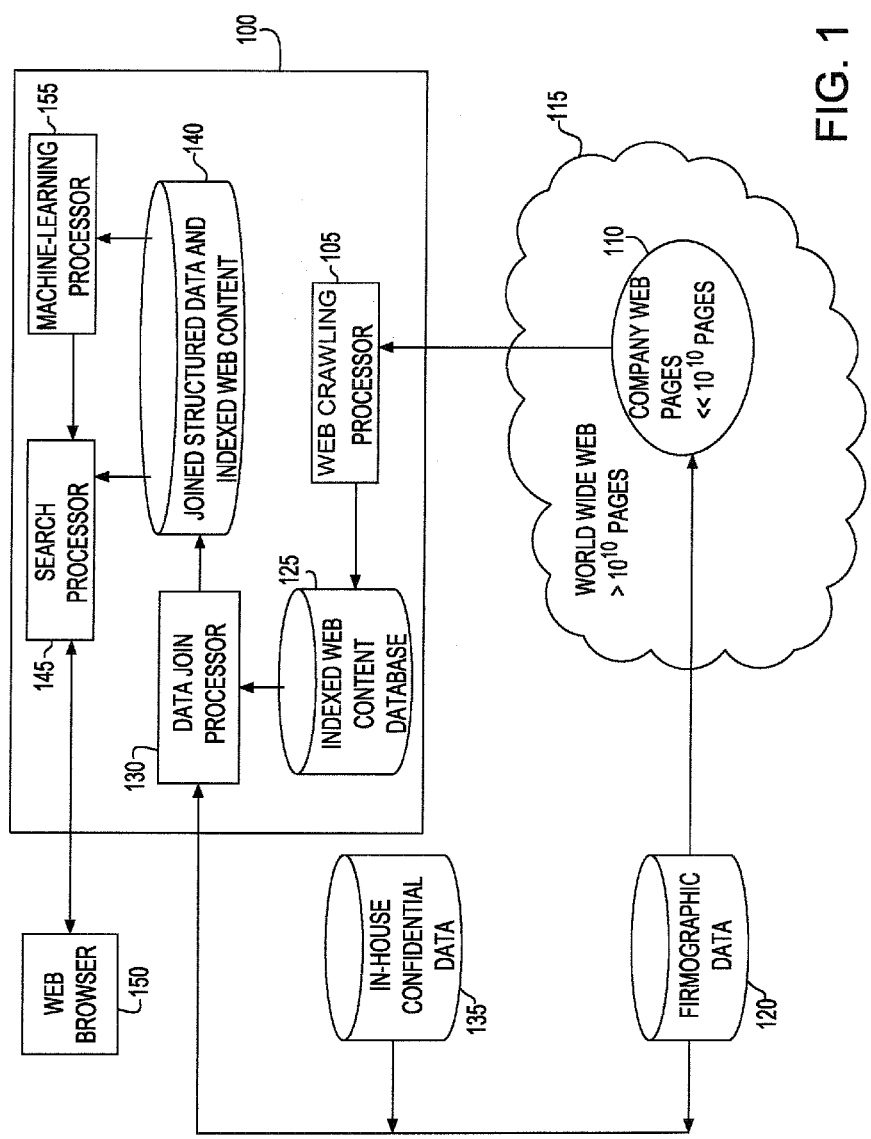
FIG. 1 is a schematic diagram of a searching system for identifying companies with specific business objectives.

FIG. 1 depicts one embodiment of a searching system (100) for identifying business entities with specific business objectives of the invention. Searching system (100) includes the web crawling processor (105) that crawls and indexes the content of web pages (110) identified as belonging to companies. The company web sites (110) comprise a subset of all pages on the Internet (115) and are identified by using company names available in existing repositories of firmographic data (120). The indexed web-site content extracted by the web crawling processor (105) is indexed and saved in the web content database (125).

The data join processor (130) combines the indexed web content from the web content database (125) with firmographic data (120) from publicly available databases as well as confidential data (135) that a user of the searching system (100) may have available. Such confidential data (135) could include previous transactions with the companies (110) or other information relevant to understanding the business strategies of said companies. These multiple sources of data are combined (or joined) using common identifiers typically maintained by firmographic data vendors to uniquely define a company (since the company name, by itself, is not a sufficiently unique). The resulting joined firmographic data (120), in-house confidential data (135) and indexed web content (125) is stored in a database (140). This database (140) is constructed such that all information for a company, including its firmographic data, its web content, and any additional confidential user-supplied data can be accessed using a specific common identifier.

The search processor (145) allows a person using a standard web browser (150) to submit queries against database (140) and display the results of the submitted query. Like standard Internet search engines, a user can submit web-content-based queries such as "risk management". However, such queries, when submitted to Internet search engines return not only companies with relevance to "risk management", but also many other pages that may provide useful content, but do not address our objective of identifying only relevant companies. Furthermore, use of searching system (100) allows a user to combine standard content-based search terms (e.g. "risk management") and firmographic features like the Industry Classification ("Financial Services") and "Annual Company Revenue<$30M"). These combined queries allow the user to focus the search in a way that cannot be achieved by either existing Internet search engines or structured searches against existing firmographic databases. Examples of search results are shown in the accompanying figures.

The machine-learning processor (155) implements predictive models that further enhance the search capabilities of the search processor (145). As described below in FIG. 6, this processor allows the user to provide feedback on the quality of searches returned by the search processor (145). This specific feedback is captured in a database, and a machine-learning model is constructed and applied for the purpose of finding other companies that best meet the user's search objectives.

Figure 2:
FIG. 2 is a display image highlighting a firmographic window comprising a user interface of the searching system.
Figure 3:
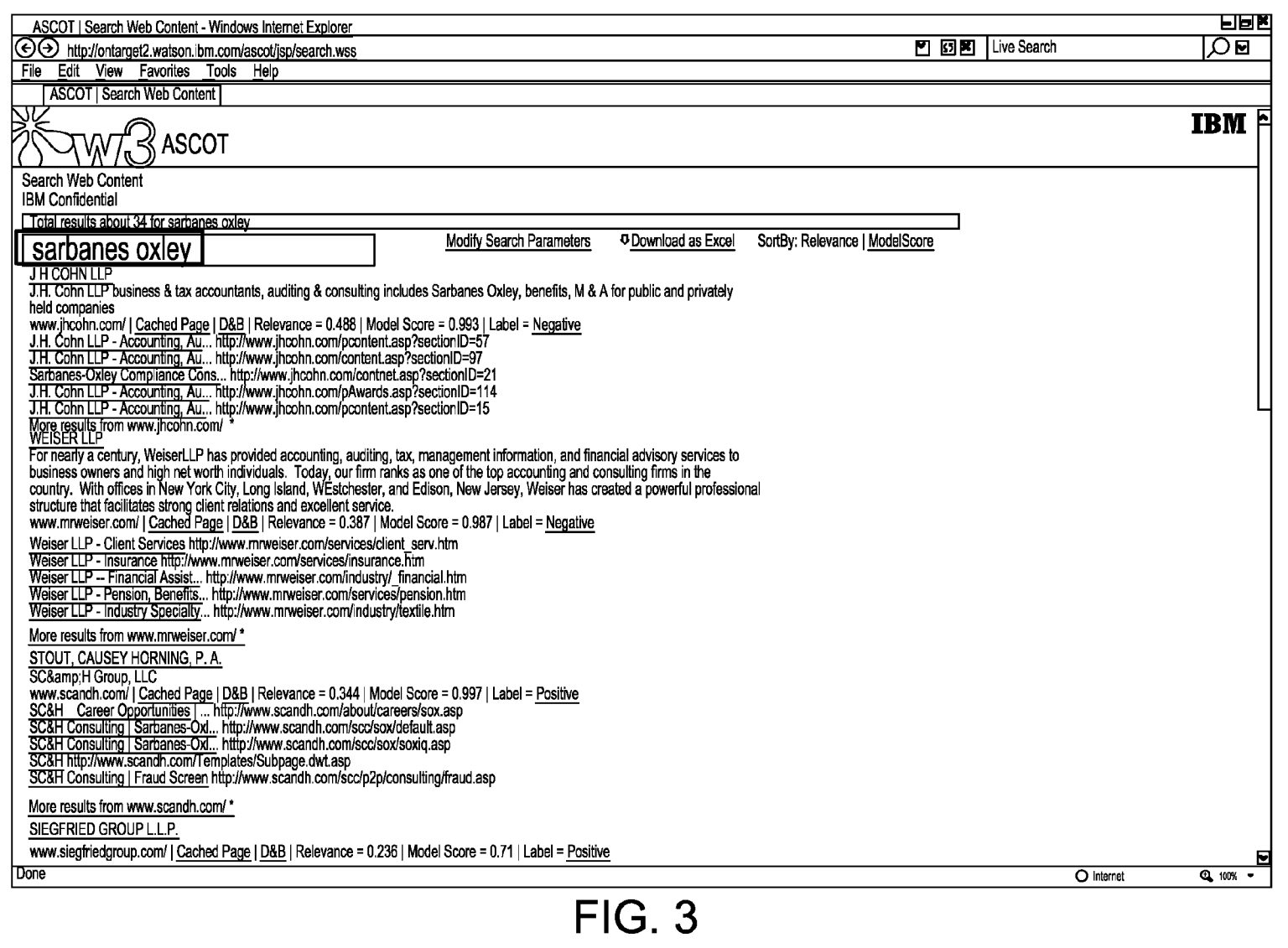
Figure 4:
FIG. 4 is display image presenting the query results of FIG. 3, and query results for the same search terms as returned in a "Google" search.

FIG. 2 is a display image (200) highlighting a firmographic window (210) generated via the browser (150) connected to the search processor (145). A content search box (220) is shown with the phrase "sarbanes oxley." FIG. 3 is a display image of query results returned by the workflow-processing interface in response to a "Sarbanes Oxley" query, including search box (220). FIG. 4 is display image presenting the "Sarbanes oxley" query results (shown in FIG. 3) for a web content search by the search processor (145) and query results for a Google search using "Sarbanes Oxley." FIG. 5 is a display image presenting the Google search results for "Sarbanes Oxley consulting" and web content search results for "Sarbanes Oxley consulting." An arrow shows the link between the separate results for Management Science associates, Inc. Unlike Google, the search process returns only companies or business entities within a user-specified firmographic window.

Figure 6:
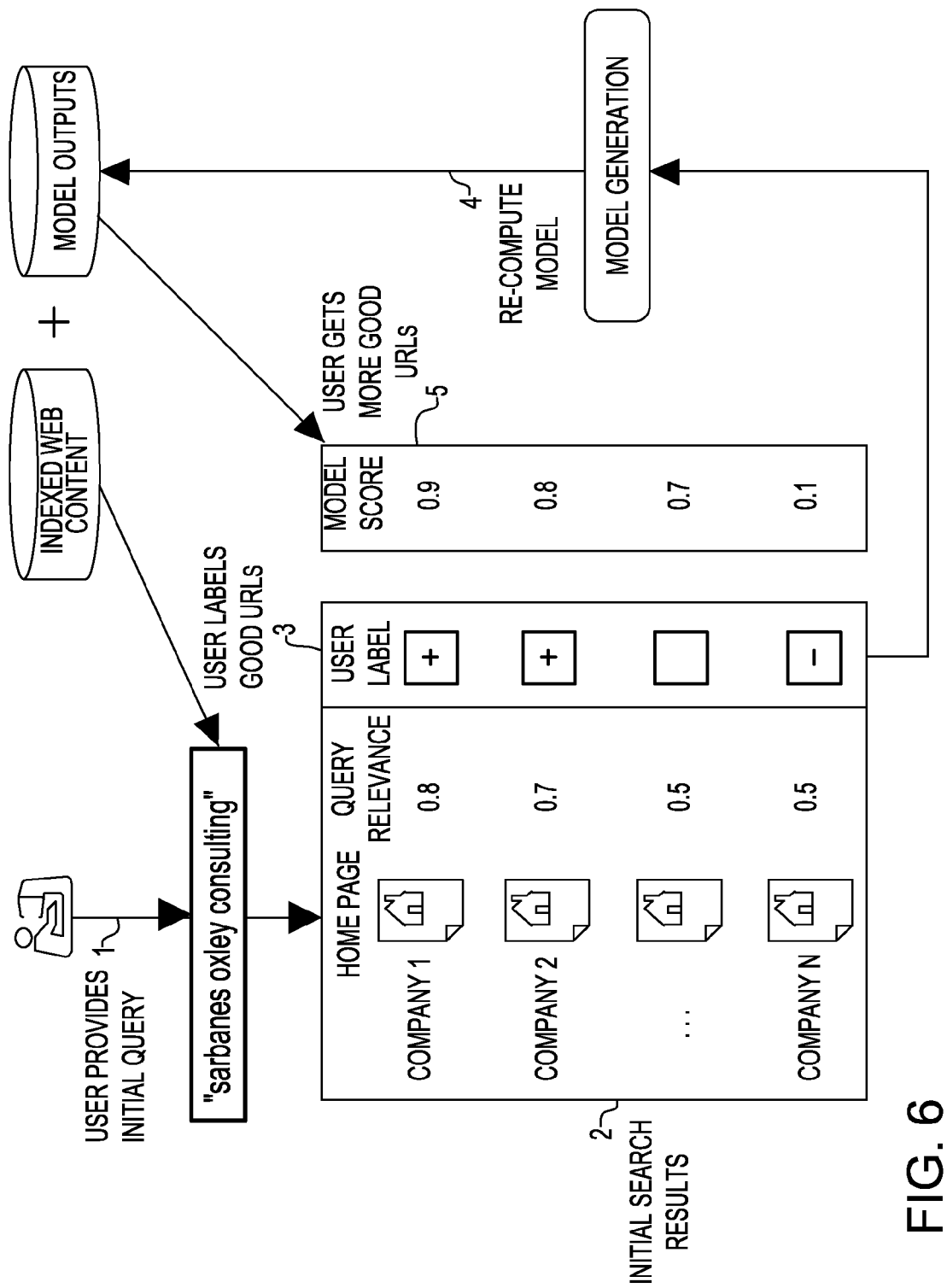
" And FIG. 6 is a schematic flow diagram that highlights the inventive on-line learning models, or machine learning capability of the invention.

FIG. 6 further describes inventive operation with respect to on-line learning models to enhance the search capability, for example, machine-learning processor (155, FIG. 1). As shown in FIG. 6 (1), a user provides an initial query ("Sarbanes Oxley consulting"). Element (2) of FIG. 6 shows a result with the company, the company home page, and a user label whereby the user interacts with the system to identify and label particular URLs, indicated by element (3). After the system (100) allows users to label "good URL", the system (100) re-computes the model, including model outputs and indexed web content, as indicated by element (4) in FIG. 6. Model generation is implemented by machine learning processor (155, FIG. 1). Based on a model score returned by the system (100), the user gets more good URLs, as represented by indicator (5).

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, comprising a tangible storage medium, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The invention comprises a method for identifying companies with specific business objectives includes using existing sources of company firmographic data to identify a broad set of companies and associated websites, crawling the websites associated with the identified companies and indexing web site content for each of the identified companies with the specific business objective to realize indexed web content. The method includes joining the company firmographic data with the indexed web content using a business objective common identifier to generate a store of joined structured firmographic data and indexed web content and presenting a display image representation of the store of joined structured firmographic data and indexed web content for user review. The display image further receives user input to score each of said companies identified therein, and using a search interface, querying the store of scored, joined structured firmographic data and indexed web content. The method further includes augmenting the search interface, or search results from a query, with predictive, machine-learning processes that allow rapid identification of companies possibly missed in the query. For that matter, the invention also includes a computer program product including a set of computer readable instructions, or executable application that when processed by a processing circuit implements the above-described method.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A method for identifying companies with specific business objectives, the method comprising the steps of:
    using existing sources of company firmographic data to identify a broad set of companies and associated websites;
    crawling the websites associated with said identified companies, and indexing web site content for each of said identified companies with said specific business objective to realize indexed web content;
    joining said company firmographic data with said indexed web content using a business objective common identifier to generate a store of joined structured firmographic data and indexed web content;
    presenting a display image representation of the store of joined structured firmographic data and indexed web content for user review, and to receive user input to score each of said companies identified therein;
    using a search interface, first querying the store of scored, joined structured firmographic data and indexed web content;
    obtaining, via said search interface, search query results including identified companies;
    receiving, at a machine processor, user provided feedback on a quality of search query results; said user provided feedback comprising a score of one or more said identified companies in a predictive, machine learning process; and
    augmenting the search interface with said predictive, machine-learning process to allow rapid identification of companies possibly missed in the first querying that are associated with said specific business objective.

2. A computer program product, the computer program product comprising:
    a tangible storage medium readable by a processing circuit and storing instructions for execution by the processing circuit for carrying out a method to:
    use existing sources of company firmographic data to identify a broad set of companies and associated websites;
    crawl the websites associated with said identified companies, and indexing web site content for each of said identified companies with said specific business objective to realize indexed web content;
    join said company firmographic data with said indexed web content using a business objective common identifier to generate a store of joined structured firmographic data and indexed web content;
    present a display image representation of the store of joined structured firmographic data and indexed web content for user review, and to receive user input to score each of said companies identified therein;
    use a search interface, first querying the store of scored, joined structured firmographic data and indexed web content and obtain search query results including identified companies; and
    obtain, via said search interface, search query results including identified companies;
    receive user provided feedback on a quality of search query results; said user provided feedback comprising a score of one or more said identified companies in a predictive, machine learning process; and
    augment the search interface with said predictive, machine-learning processes that process to allow rapid identification of companies possibly missed in the first querying that are associated with said specific business objective.

3. A searching system for searching the World Wide Web (WWW) to identify companies having a specific business objective comprising:
    a web crawling processor for crawling the websites of companies identified in accordance with specific firmographic objectives, and indexing web content of said websites;
    a data join processor for joining the firmographic data of the companies with specific firmographic objectives with the indexed web content for said companies, and providing the joined firmographic data and indexed web content in a joined data and indexed web content store;
    a search processor for receiving user search queries that combine firmographic constraints with content relevance, and searching, via a display image representation of the store of joined structured firmographic data and indexed web content, the store in accordance said specific business object objective, and obtain search query results including identified companies;
    a machine learning processor for receiving user provided feedback on a quality of said search query results; said user provided feedback comprising a score of one or more said identified companies in a predictive, machine learning process, said machine learning processor implementing predictive modeling with the joined firmographic data and indexed web content to allow rapid identification of companies possibly missed in a prior search query, wherein the search processor searches the joined firmographic data and indexed web content after said predictive modeling.

4. The searching system as set forth in claim 3, further comprising a web browser in communication with the search processor.

5. The searching system as set forth in claim 3, further comprising a searchable store of in-house confidential data, that is utilized by the data join processor in said step of joining.

6. The searching system as set forth in claim 3, further comprising a display processor to facilitate user access to said search processor, web crawling processor, data join processor and machine learning processor.

7. The searching system as set forth in claim 6, wherein said display processor provides a user with a search interface for querying the joined firmographic data and indexed web content with respect to said specific business objective and obtaining said search query results including identified companies.

* * * * *